United States Patent [19]

Ostertag et al.

[11] Patent Number: 4,530,725

[45] Date of Patent: Jul. 23, 1985

[54] PREPARATION OF THERMALLY STABLE LEAD CHROMATE PIGMENTS

[75] Inventors: Werner Ostertag, Gruenstadt; Peter Dimroth, Mannheim; Henning Wienand, Neulussheim; Egon Liedek, Esslingen; Helmut Knittel, Ludwigsburg; Günter Etzrodt, Stuttgart, all of Fed. Rep. of Germany

[73] Assignees: BASF Farben; Fasern Aktiengesellschaft, both of Hamburg, Fed. Rep. of Germany

[21] Appl. No.: 625,604

[22] Filed: Jun. 28, 1984

[30] Foreign Application Priority Data

Jun. 28, 1983 [DE] Fed. Rep. of Germany ....... 3323247

[51] Int. Cl.$^3$ ............................................... C08K 3/00
[52] U.S. Cl. .................. 106/298; 106/287.3; 106/306
[58] Field of Search .................. 106/287.34, 298, 306

[56] References Cited

U.S. PATENT DOCUMENTS

| 2,237,104 | 4/1941 | Livingston | 106/298 |
| 3,046,152 | 7/1962 | Shiraishi | 106/306 |
| 3,118,780 | 1/1964 | Dunn, Jr. et al. | 106/298 |
| 3,370,971 | 2/1968 | Linton | 106/298 |
| 3,470,007 | 9/1969 | Linton | 106/298 |
| 3,639,133 | 2/1972 | Linton | 106/298 |
| 3,773,535 | 11/1973 | Burgyan et al. | 106/298 |
| 4,017,328 | 4/1977 | Higgins | 106/298 |
| 4,054,465 | 10/1977 | Ziobrowski | 106/298 |
| 4,059,459 | 11/1977 | Higgins | 106/298 |
| 4,247,338 | 1/1981 | Ziobrowski | 106/298 |

FOREIGN PATENT DOCUMENTS 1221858 9/1966 Fed. Rep. of Germany .
1253384 11/1967 Fed. Rep. of Germany .

Primary Examiner—Paul Lieberman
Assistant Examiner—Willie J. Thompson
Attorney, Agent, or Firm—Oblon, Fisher, Spivak, McClelland & Maier

[57] ABSTRACT

Thermally stable lead chromate pigments or pigments containing lead chromate, which have high color strength and are provided with a precipitated coating containing silicon dioxide, are prepared by a process in which an aqueous pigment suspension is mixed once or several times with an aqueous $MgSiF_6$ solution, the pH being maintained at 4.5–9.5 and the temperature at 50°–95° C., and the pigment is then separated off and worked up, these steps being carried out in a conventional manner.

3 Claims, No Drawings

PREPARATION OF THERMALLY STABLE LEAD CHROMATE PIGMENTS

Lead chromate pigments, in particular chrome yellows, which are thermally stable up to 300° C. and above are in increasing demand for coloring plastics. This is attributable to the fact that the use of the yellow pigment conventionally employed to date for coloring plastics is no longer permitted in many cases for toxicological reasons. In order for the pigment to be suitable for incorporation into conventional plastics, it should be thermally stable for not less than 5 minutes at 325° C. Thermostability is usually understood as meaning that, after the pigment has been incorporated into the particular plastic under mild conditions, the resulting ΔE values measured in accordance with the CIELAB-system and compared with the coloration of the unheated plastic, are no higher than 3. Processes have been disclosed which are intended to achieve thermostability of lead chromate pigments and pigments containing lead chromate. In these processes, the surfaces of the lead chromate pigments are protected by a coating of a material which is stable to reduction, in order to prevent hue-modifying reactions during melting of the plastic. In order to ensure this, layers of various thicknesses, mainly $SiO_2$ coatings, can be applied to the pigment. However, even coatings of $SiO_2$ which amount to as much as 40% by weight of the total weight of the coated pigment are ineffective when these coatings do not provide a tight and uniform protection of the chromate pigment underneath against adverse effects during melting of the plastic. Moreover, it is clear that thick coatings of colorless $SiO_2$ or other non-colored layers result in an undesirable reduction in the coloring power of the pigments.

We have found that the conventional processes for applying an $SiO_2$ coating onto chromate-containing pigments do not always have the desired success because the process for the preparation of tight and uniform coatings is difficult to carry out, since even small deviations in the preparation conditions, in particular with regard to the pH or the concentration of the pigment suspension, result in non-uniform deposition on the pigment surface. The difficulty of applying $SiO_2$ coatings to lead chromate pigments may be due to, inter alia, the fact that damage to the colored pigment can be avoided only at a pH close to the neutral point. On the other hand, it is in this pH range in particular that silica tends to form Si—O—Si bridges or to polymerize, so that it is unable to form firmly adhering layers.

It is an object of the present invention to provide thermally stable lead chromate pigments or pigments containing lead chromate and a process for their preparation, the pigments possessing excellent thermostability and having a coating of $SiO_2$ which has less effect on the color strength than was previously the case. A novel preparation process offers the possibility of applying a highly cohesive coating of $SiO_2$ onto the pigments in a reliable and readily reproducible manner.

We have found that this object is achieved, and that the corresponding lead chromate pigments or pigments containing lead chromate, having a precipitated coating containing silicon dioxide, are prepared, in accordance with the invention, by a process in which an aqueous suspension of the said pigment is mixed with an aqueous solution of magnesium silicate ($MgSiF_6$), the pH being maintained at 4.5-9.5, preferably 6-7.5 and the temperature at 50°-90° C. After the coated pigment has been separated off, further processing is carried out in a conventional manner, ie. by filtration, washing and drying. Instead of the $MgSiF_6$ solution, it is of course also possible to use other salt solutions in which magnesium and $SiF_6$ ions are present in dissociated form. For the purposes of the present invention, lead chromate pigments or pigments containing lead chromate comprise the simple chromate of lead ($PbCrO_4$) or mixed crystals containing lead sulfate and/or lead molybdate. Although the various members of these groups of pigments can be used in the novel process, the yellow chromate pigments are particularly important with regard to the coloring of plastics. The amount of magnesium fluorosilicate required for thermostabilization depends on the free surface area of the lead chromate pigment used and cannot be defined exactly because the preparation procedure, which affects the size of the free surface area, is different in each case. In general, however, lead chromate yellow pigments, or yellow pigments containing lead chromate, which have a BET surface area of 8-10 $m^2/g$ will have the desired thermostability, being stable to above 320° C., if they contain from 0.5 to 10% by weight of magnesium, from 2 to 25% by weight of silicon and from 0.3 to 20% by weight of fluorine, the percentages being based on the total weight of the coated pigment. Thermally stable products having a particularly high color strength contain less than 5% by weight of magnesium, 6% by weight of silicon and 6% by weight of fluorine. The pigments to be coated can be used in pure form (bare pigments) or can be provided with quality-improving additives, eg. antimony oxide, silicates, aluminum hydroxide and the like. If the pigments used have already been prestabilized, for example to the effects of light and $SO_2$, by, for example, silicates, antimony and the like (eg. the pigments prepared as described in German Pat. No. 1,224,858), it may be advantageous to carry out the addition of the magnesium fluorosilicate solution not once but several times. In this case, for example, the following procedure can be followed: a first coating is applied to the bare product in the novel manner, then, for example, the abovementioned quality-improving additives are introduced, and finally a second coating according to the invention is applied. In a typical case, the coating procedure is carried out as follows: a suspension of lead chromate pigments, or of pigments containing lead chromate, which has a pH of from 6 to 7 after the preparation of these pigments, is stirred with a 10% strength by weight aqueous solution of magnesium fluorosilicate while a 10% strength by weight alkali, ammonia or water glass solution is fed in simultaneously. These solutions are added in the course of from 0.5 to 3 hours. The temperature during mixing is from 50° to 95° C., advantageously from 65° to 95° C., and stirring is continued for from 30 minutes to 1.5 hours, the pH being kept at 6.5±0.3. The pigment is then filtered off, washed and dried. It is of course also possible to repeat the above treatment (for example before the filtration) once or several times. If, as a result of its method of preparation, the starting suspension has a basic pH, the suspension is first brought to a pH of 6-7 by adding an acid, e.g. dilute sulfuric acid, and the procedure according to the invention, as described above, is then followed.

It is probable that the measures according to the invention and the presence of magnesium fluorosilicate substantially prevent the formation of fairly large aggregates containing Si—O—Si bonds, as occurs when ortho silicate salts are used exclusively, and tighter and more firmly adhering coatings are consequently obtained. The applied coating contains silicon and oxygen as well as magnesium and fluorine, and is amorphous according to X-ray analysis. The layers deposited on the pigment surface by the novel process do not exhibit as much shrinkage as the fluorine-free layers deposited by conventional processes.

Furthermore, the relative concentrations of magnesium, fluoride and residual silicate in the coating can vary within wide limits. For example, the fluorine content of the coating depends on the concentration of the suspension and on the hydrolysis conditions for the $SiF_6^{--}$ ions as well as on the salts, e.g. sodium fluoride, which can be used in a conventional manner, independently of the novel process, before the preparation of the lead chromate pigments.

The advantage of the novel process is that tight cohesive coatings which make the product thermally stable can be obtained in a reliable manner. Such coatings can also be obtained using a comparatively smaller amount of silicate, with the result that the color strength of the resulting coated pigments is changed only slightly compared with the starting material.

The process according to the invention is also inventive. For example, German Pat. No. 1,253,384 discloses a process for the preparation of molybdate red and molybdate orange pigments which are stable to sulfurous acid, wherein water-soluble antimony(III) compounds and soluble salts of fluorosilicic acid or water-soluble salts which give antimony (III) ions, fluoride ions and silicate ions are added to the precipitated pigments, after which the pigments are brought to a pH of 6-8.5 with an alkali. The water-soluble fluoride ions which are required in the stated process and which are also formed by, for example, hydrolysis of salts of fluorosilicic acid are very substantially eliminated in this process, as described above, and their presence in the end product is not absolutely necessary for achieving stability to $SO_2$.

It was therefore surprising and could not be foreseen that the use of magnesium fluorosilicate by the novel process and the fact that fluoride ions are always detectable in products obtained by this process would result in an improvement in the thermostability. In contrast to products obtained by the novel process, those obtained in accordance with German Pat. No. 1,253,384 do not show any improvement in thermostability. This also applies to German Pat. No. 1,224,858, which relates to a process for improving the lightfastness and weather-fastness of chrome yellows. Accordingly, in the two stated cases, it is also impossible to detect a cohesive tight coating with silicate by means of electron microscopy. On the other hand, products as obtained by German Pat. Nos. 1,253,384 and 1,224,858 can be used as starting materials for the novel process, by means of which they achieve the desired thermostability, which they did not possess previously.

As described above, it is also possible to apply two coatings according to the invention. For the stated products, this means applying a first coating onto the bare pigment, then carrying out the process according to the particular patents stated, and finally applying a second coating, once again in accordance with the invention.

EXAMPLES

Example 1a

Preparation of an Uncoated (Bare) Lead Chromate Pigment Starting Material 12.4 kg of lead nitrate, $Pb(NO_3)_2$ are dissolved in 160 liters of water, while stirring, after which an aqueous solution, at 20° C., consisting of 6.0 kg of sodium chromate ($Na_2CrO_4$), 1 kg of $Na_2SO_4$ and 1.0 kg of NaCl in 30 liters of water is added to the stirred solution in the course of 15 minutes. The suspension, which has a pH of 4.5-6.3 is heated to 90±5° C. in the course of from 10 to 20 minutes, and is stirred at this temperature for 1 hour.

Example 1b

Preparation of a Light-Stabilized and $SO_2$-stabilized lead Chromate Pigment Starting Material 0.058 kg of $Al_2(SO_4)_3$ . 14 $H_2O$, dissolved in $H_2O$, (density 1.3), and 0.038 kg of $Na_2SO_4$, dissolved in 0.9 liters of $H_2O$, are added, while stirring at 70° C., to the $PbCrO_4$ pigment-containing suspension precipitated as described in Example 1a. The pH is then brought to 6.0 with a 10% strength by weight $NaHCO_3$ solution, after which 0.1 liters of a cold dilute water glass solution (d=1.38) is added to the stirred mixture until the pH is 8.9-9.1 at 60° C.

A solution consisting of 0.066 kg of $Sb_2O_3$ and 0.25 kg of 3% strength by weight HCl in 0.2 liters of $H_2O$ is then added to the stirred suspension, the pH of the suspension being kept at 6.0-6.8 with 5% strength by weight aqueous NaOH. The pH is finally brought to 6.8. The pigment contains Pb, $CrO_4^{--}$ and $SO_4^{--}$, as well as 0.3% by weight of Al, 2.4% by weight of Si and 4% by weight of Sb.

EXAMPLE 2

100 g of the lead chromate prepared as described in Example 1b are introduced into 1,330 g of water, and the mixture is brought to pH 6.5 with dilute sulfuric acid. The suspension is then heated to 75° C., after which a solution of 30 g of $MgSiF_6$ . 6 $H_2O$ in 270 g of $H_2O$ is fed in over 25 minutes while stirring, and at the same time 10% strength by weight sodium hydroxide solution is added so that the pH does not fall below 6.2.

The suspension is stirred for a further hour at pH 6.2 and 75° C., after which it is filtered, and the product is washed, and dried at 105° C.

The resulting product is readily dispersible and contains Pb, chromate and sulfate, as well as 0.26% by weight of Al, 3.5% by weight of Sb, 4.5% by weight of Si, 3.3% by weight of Mg and 5.4% by weight of F. Electron micrographs (magnification 1:50,000) show a very homogeneous coating which is 0.5-0.08 A thick.

The color strength of the pigment is 10% lower than that of the starting pigment.

The results of the thermostability test are reproduced in Table 1.

Example 3

Preparation of a Heat-stabilized Lead Chromate, Using a Bare Lead Chromate Pigment 100 g of the lead chromate pigment prepared as described in Example 1a are stirred into 1,300 g of water. The pH is brought to 6.2 with dilute sulfuric acid, after which the suspension is heated to 70° C. and a solution of 200 g of $MgSiF_6$ . 6 $H_2O$ in 1,500 g of $H_2O$ is added in the course of 1 hour, the pH being increased to 7.1 by adding 10% strength by weight sodium hydroxide solution. Stirring is then continued for 60 minutes at 70° C. (pH 6.4).

A solution of 20 g of sodium water glass ($Na_2O \cdot 3.25\ SiO_2$) in 180 g of $H_2O$ is then added while stirring, dilute sulfuric acid being introduced simultaneously so that the resulting pH is 7.0. The suspension is stirred for a further 1 hour at 70° C., and is then filtered while hot, washed with water and dried.

The resulting product readily dispersible and contains lead, chromate and sulfate, as well as 5.8% by weight of Si, 9.8% by weight of fluorine and 1.1% by weight of magnesium. The product has a free surface area of 9.5 $m^2/g$ (BET).

Electron micrographs show that the previously uncoated $PbCrO_4$ pigment has a 0.06–0.1 μm thick, homogeneous coating after the stabilization procedure. The measurement of the thermostability is shown in Table 1.

Example 4

100 g of the lead chromate prepared as described in Example 1b are stirred into 1,330 g of water, and the mixture is brought to pH 4.5±0.5 with dilute sulfuric acid. The suspension is heated to 75° C., while stirring, after which a solution of 80 g of $MgSiF_6 \cdot 6\ H_2O$ in 720 g of $H_2O$ is added in the course of 1 hour. At the same time, a 10% strength by weight NaOH solution is added so that the pH of the suspension increases to 7.

The suspension is stirred for a further hour at 75° C. and at a pH of 6.5, after which it is filtered and the product is washed, and dried at 105° C.

The resulting product is readily dispersible and contains Pb, $CrO_4{-}{-}$ and $SO_4{-}{-}$, as well as 0.26% by weight of Al, 3.4% by weight of Sb, 8.7% by weight of Si, 6.1% by weight of Mg and 13.0% by weight of F. The color strength of the product is 20% lower than that of the starting material.

Example 5

100 g of molybdate red prepared as described in Example 1 of German Pat. No. 1,253,384 are treated as described in Example 2 of the present application. The resulting molybdate red pigment has a thermostability similar to that of the lead chromate prepared as described in Example 2.

The results of the thermostability test are shown in Table 1.

Measurement of the Thermostability of the Samples

1% strength mixtures of lead chromate and plastic granules (high density polyethylene) are prepared by rolling for 1 hour in a glass bottle on a roll mill. The mixture is then introduced into the feed hopper of a screw injection molding machine. The material introduced is brought to 320° C. and then remains for a further 5 minutes at the temperature set. The entire charge in the screw injection molding machine is then molded to give small plates.

The moldings are measured colorimetrically in accordance with DIN 6174. The pigment is said to be thermally stable if the change in color compared with a molding at 270° C. is no greater than $\Delta E=3$, the $\Delta E$ value also including changes due to the plastic.

Table 1 shows the thermostabilities of the samples.

| Sample | Test 1a | Test 1b | Test 2 | Test 3 | Test 4 | Test 5 |
|---|---|---|---|---|---|---|
| $\Delta E$ | 25 | 22 | 2.8 | 2.5 | 2.4 | 2.0 |

We claim:
1. A process for the preparation of a thermally stable lead chromate pigment, or pigment containing lead chromate, which has a high color strength and is provided with a precipitated coating containing silicon dioxide, wherein an aqueous pigment suspension is mixed with an aqueous $MgSiF_6$ solution, the pH being maintained at 4.5–9.5 and the temperature at 50°–95° C. and the pigment is then separated off and worked up, these steps being carried out in a conventional manner.

2. A process as claimed in claim 1, wherein the pH is kept at 6–7.5.

3. A process as claimed in claim 1, wherein the treatment with the $MgSiF_6$ solution is repeated once or several times before the pigment is separated off.

* * * * *